United States Patent
Peterson

(10) Patent No.: US 7,882,274 B2
(45) Date of Patent: Feb. 1, 2011

(54) COMPUTER SYSTEM WITH MULTIPLE TERMINALS

(75) Inventor: David A. Peterson, Cazenovia, NY (US)

(73) Assignee: Virtual Desktop Technologies, Inc., Syracuse, NY (US)

( * ) Notice: Subject to any disclaimer, the term of this patent is extended or adjusted under 35 U.S.C. 154(b) by 321 days.

(21) Appl. No.: 12/234,223

(22) Filed: Sep. 19, 2008

(65) Prior Publication Data

US 2009/0083450 A1 Mar. 26, 2009

Related U.S. Application Data

(60) Provisional application No. 60/973,923, filed on Sep. 20, 2007.

(51) Int. Cl.
  *G06F 3/00* (2006.01)
  *G06F 3/01* (2006.01)
(52) U.S. Cl. .......................... 710/10; 715/719
(58) Field of Classification Search ................. 710/10; 715/719
  See application file for complete search history.

(56) References Cited

U.S. PATENT DOCUMENTS

| | | |
|---|---|---|
| 4,155,119 A | 5/1979 | De Ward et al. |
| 5,038,281 A | 8/1991 | Peters |
| 5,410,709 A | 4/1995 | Yu |
| 5,694,150 A | 12/1997 | Sigona et al. |
| 5,903,752 A | 5/1999 | Dingwall et al. |
| 6,247,109 B1 | 6/2001 | Kleinsorge et al. |
| 6,269,409 B1 | 7/2001 | Solomon |

(Continued)

FOREIGN PATENT DOCUMENTS

EP 1162536 A1 12/2001

(Continued)

OTHER PUBLICATIONS

Banga et al., Resource conainers: A new facility for resource management in servers systems, USENIX Symposium, Feb. 1999.*

(Continued)

*Primary Examiner*—Henry W Tsai
*Assistant Examiner*—Hyun Nam
(74) *Attorney, Agent, or Firm*—George R. McGuire; David B. Woycechowsky; Bond Schoeneck & King, PLLC

(57) ABSTRACT

A computer system having a host computer and multiple terminals. The host computer (including any peripheral hubs or the like) has groups of at least three I/O ports (preferably USB ports) where the I/O ports of a single group are supposed to be used to connect I/O devices associated with a single terminal. When connecting up a new terminal, after a user connects two I/O devices into a group and affirmatively indicates, by user input, that these belong to the same terminal, then further devices subsequently connected into the same group of I/O ports will be automatically assigned to the terminal previously indicated by the user. Also, a computer system where multiple operating systems are respectively used to control multiple displays. A video output module creates a master frame display including display data for (at least) the displays of all of the operating systems. The master frame display is split into portions respectively corresponding to each operating system.

10 Claims, 15 Drawing Sheets

U.S. PATENT DOCUMENTS

| | | | |
|---|---|---|---|
| 6,448,956 B1 | 9/2002 | Berman et al. | |
| 6,493,008 B1 | 12/2002 | Yui | |
| 6,597,383 B1 | 7/2003 | Saito | |
| 6,684,343 B1 | 1/2004 | Bouchier et al. | |
| 6,738,028 B2 | 5/2004 | Asahi et al. | |
| 6,802,010 B1 | 10/2004 | Kim et al. | |
| 6,957,435 B2 | 10/2005 | Armstrong et al. | |
| 6,968,343 B2 | 11/2005 | Charisius et al. | |
| 6,993,620 B2 | 1/2006 | Ferguson | |
| 7,030,836 B2 | 4/2006 | Justice et al. | |
| 7,158,140 B1 | 1/2007 | Klebanov | |
| 7,161,557 B2 | 1/2007 | Thornton | |
| 7,386,622 B2 * | 6/2008 | Tanaka | 709/230 |
| 7,657,550 B2 * | 2/2010 | Prahlad et al. | 707/999.101 |
| 7,660,803 B2 * | 2/2010 | Jin | 715/741 |
| 7,786,996 B2 * | 8/2010 | Unger | 345/506 |
| 2001/0016879 A1 | 8/2001 | Sekiguchi et al. | |
| 2003/0014476 A1 | 1/2003 | Peterson | |
| 2003/0018892 A1 | 1/2003 | Tello | |
| 2003/0110173 A1 | 6/2003 | Marsland | |
| 2003/0115443 A1 | 6/2003 | Cepulis et al. | |
| 2003/0151885 A1 | 8/2003 | Chang | |
| 2003/0221087 A1 | 11/2003 | Nagasaki | |
| 2004/0002052 A1 | 1/2004 | Hendry | |
| 2004/0073912 A1 | 4/2004 | Meza | |
| 2004/0107383 A1 | 6/2004 | Bouchier et al. | |
| 2004/0226041 A1 | 11/2004 | Smith et al. | |
| 2005/0120160 A1 | 6/2005 | Plouffe | |
| 2005/0177700 A1 | 8/2005 | Park | |
| 2005/0198578 A1 | 9/2005 | Agrawala | |
| 2006/0004944 A1 | 1/2006 | Vij et al. | |
| 2006/0005190 A1 | 1/2006 | Vega et al. | |
| 2006/0010314 A1 | 1/2006 | Xu | |
| 2006/0053215 A1 | 3/2006 | Sharma | |
| 2006/0065492 A1 | 3/2006 | Trifu | |
| 2006/0069828 A1 | 3/2006 | Goldsmith | |
| 2006/0080514 A1 | 4/2006 | Newport | |
| 2006/0112394 A1 | 5/2006 | Asai et al. | |
| 2006/0136913 A1 | 6/2006 | Sameske | |
| 2006/0206904 A1 | 9/2006 | Watkins et al. | |
| 2006/0214873 A1 | 9/2006 | Park et al. | |
| 2006/0218309 A1 | 9/2006 | Young et al. | |
| 2006/0229935 A1 | 10/2006 | Subbloie et al. | |
| 2006/0267857 A1 | 11/2006 | Zhang et al. | |
| 2007/0028082 A1 | 2/2007 | Lien | |
| 2007/0035470 A1 | 2/2007 | Lee et al. | |
| 2007/0043928 A1 | 2/2007 | Panesar et al. | |
| 2007/0057953 A1 | 3/2007 | Green | |
| 2007/0067500 A1 | 3/2007 | Reyes et al. | |
| 2007/0078891 A1 | 4/2007 | Lescouet et al. | |
| 2007/0097130 A1 | 5/2007 | Margulis | |
| 2007/0136721 A1 | 6/2007 | Dunshea et al. | |
| 2007/0174410 A1 | 7/2007 | Croft et al. | |
| 2007/0174414 A1 | 7/2007 | Song et al. | |
| 2007/0204265 A1 | 8/2007 | Oshins | |
| 2008/0046724 A1 * | 2/2008 | Dailey | 713/164 |
| 2008/0077917 A1 | 3/2008 | Chen et al. | |
| 2008/0092145 A1 | 4/2008 | Sun et al. | |
| 2008/0168479 A1 | 7/2008 | Purtell et al. | |
| 2009/0083630 A1 * | 3/2009 | Peterson | 715/719 |
| 2009/0083829 A1 * | 3/2009 | Peterson | 726/1 |
| 2010/0115125 A1 * | 5/2010 | Peterson | 709/236 |
| 2010/0115532 A1 * | 5/2010 | Peterson | 719/320 |

FOREIGN PATENT DOCUMENTS

| | | |
|---|---|---|
| EP | 1467282 A2 | 10/2004 |
| EP | 1732271 A1 | 12/2006 |
| WO | WO 99/40520 | 8/1999 |

OTHER PUBLICATIONS

Pasquale et al., Container Shipping, IEEE, Mar. 1994.*

Chaffardon, et al., RD 462054, DERWENT English abstract provided; patent not available.

Ncomputing X300: "X300 Access Terminal Kit," Ncomputing, at http://www.noncomputing.com/ncomputing/products/direct.php as of Jul. 31, 2007.

Applica product documentation: PC Sharing, Applica Lite and other miscellaneous related documentation, Applica, Inc. at http://www.applica.com/categories/pcsharing.htm as of Jul. 31, 2007.

ThinSoft product documentation: ThinSoft Buddy B-680 User Manual, ThinSoft PTE Ltd., dated 2003.

HP441 product documentation: "HP Multi-User 441 Desktop Solution brochure" dated 2005.

Disjunkt X-Headed Linux documentation: "Another Quick How-To for Dual-X-Headed/Legged Linux," Jean-Daniel Pauget, dated Mar. 14, 2003 and updated Feb. 27, 2006, at http://disjunkt.com/dualhead/bruby-dualhead as of Sep. 21, 2007.

Hartenstein, et al., "Two-Level Hardware/Software Partitioning Using CoDe-X," Reiner W. Hartenstein et al., IEEE, dated 1996.

Virtual machine—Wikipedia, the free encyclopedia at http://en.wikipedia.org/wiki/Virtual_machine as of Nov. 20, 2007.

Container (data structure) Wikipedia, the free encyclopedia at http://en.wikipedia.org/wiki/Container_%28data_structure%29 as of Nov. 20, 2007.

Operating system—Wikipedia, the free encyclopedia at http://en.wikipedia.org/wiki/Operating_system as of Nov. 20, 2007.

* cited by examiner

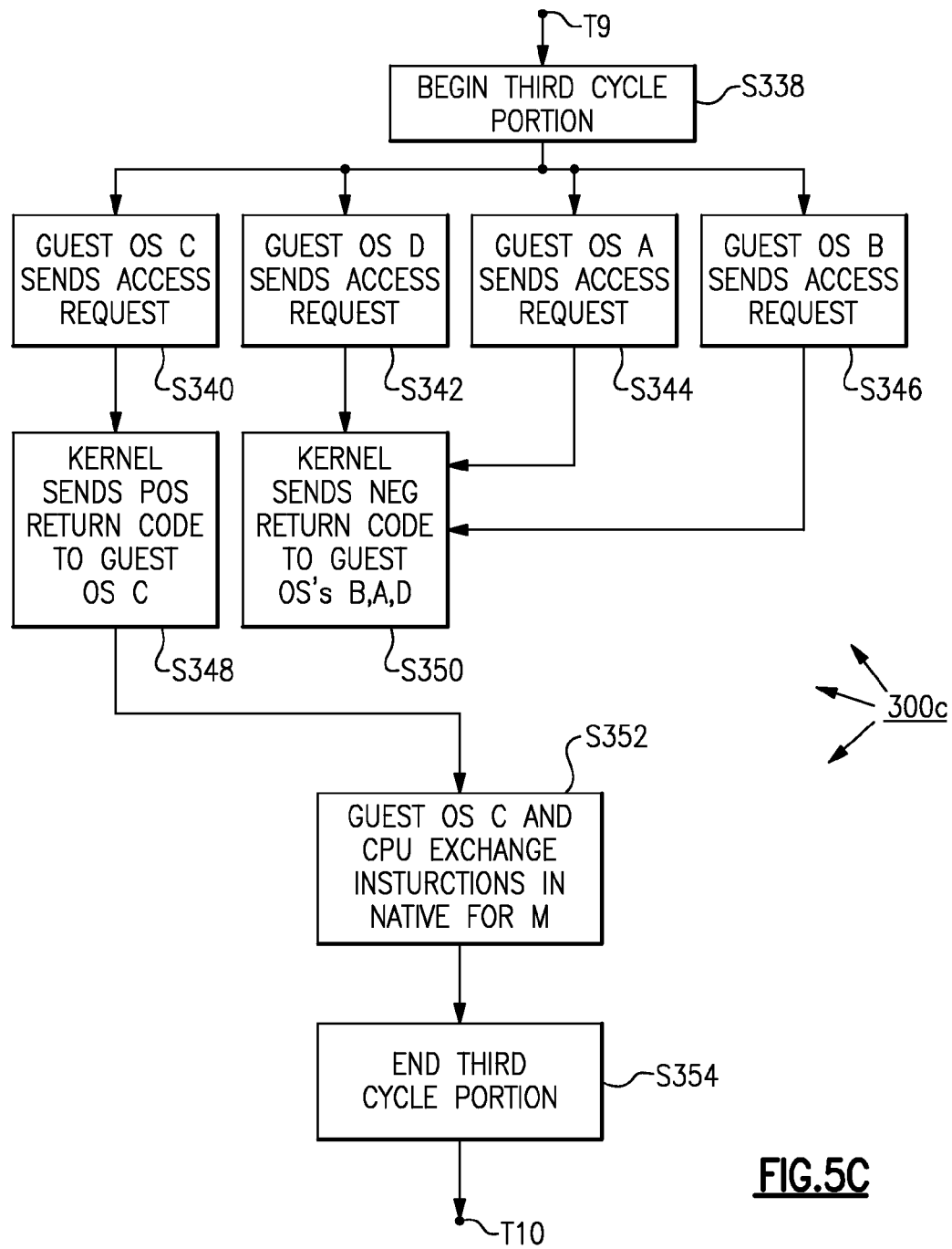

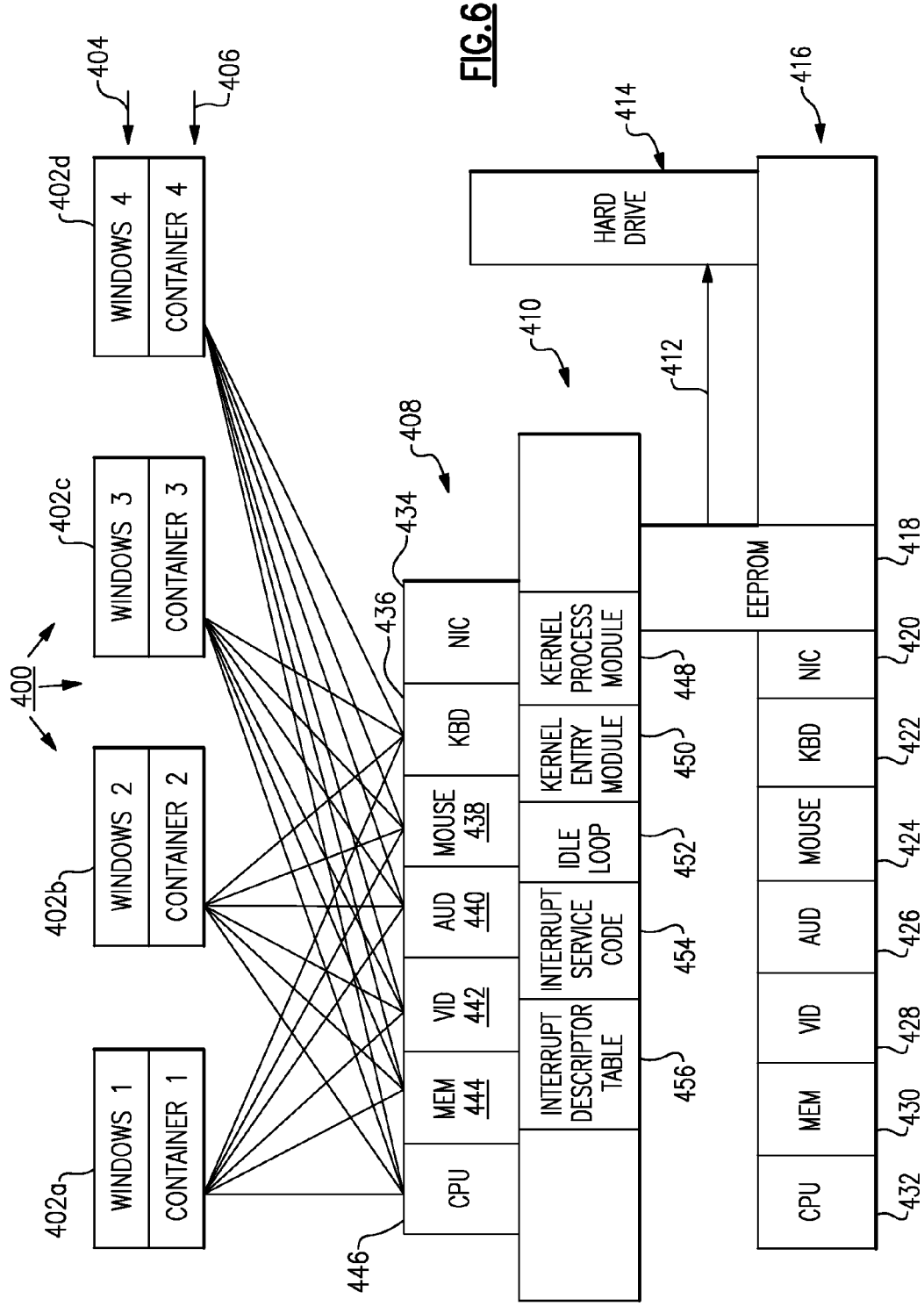

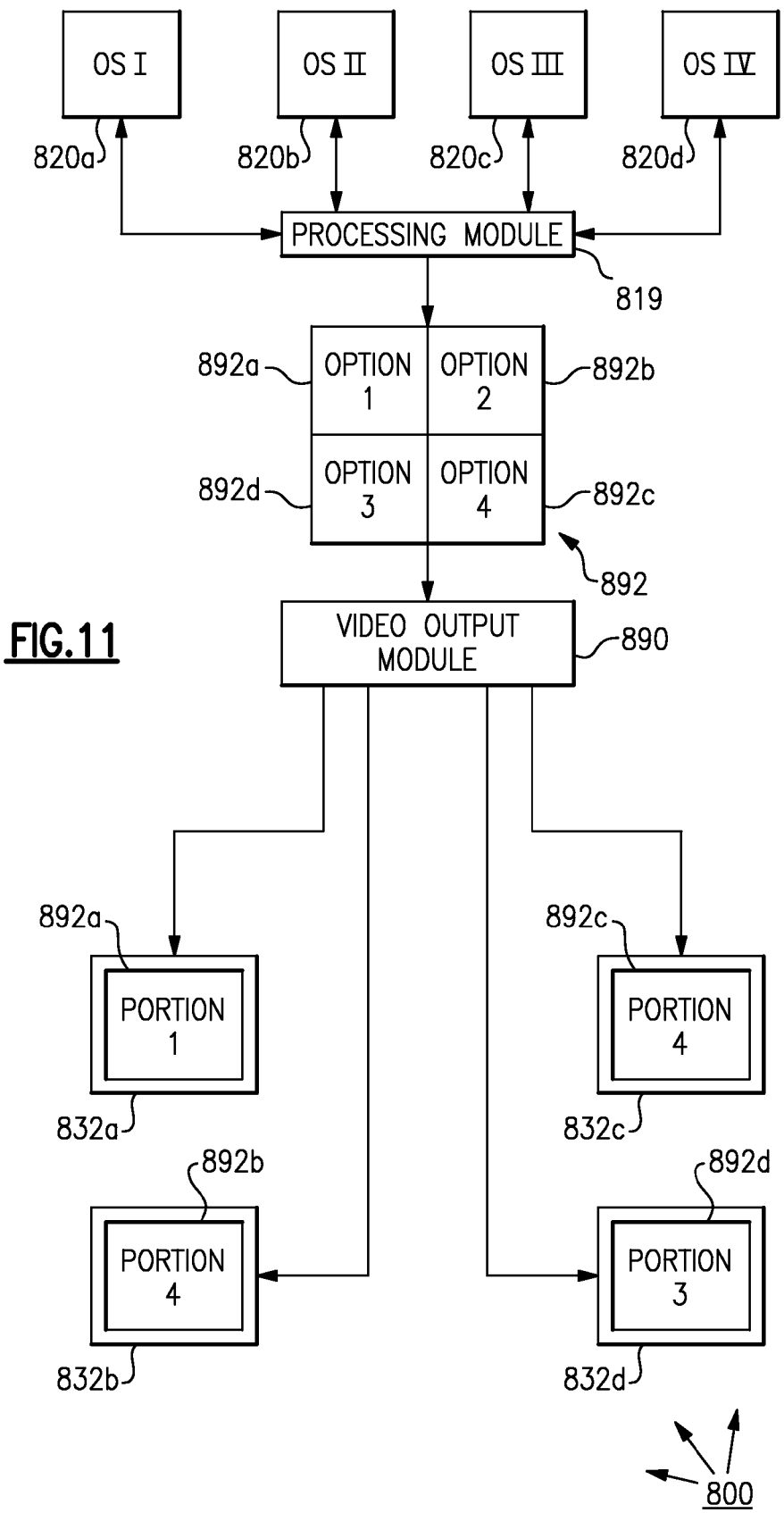

2

COMPUTER SYSTEM WITH MULTIPLE TERMINALS

RELATED APPLICATION

The present application claims priority to U.S. provisional patent application No. 60/973,923, filed on Sep. 20, 2007; all of the foregoing patent-related document(s) are hereby incorporated by reference herein in their respective entirety(ies).

BACKGROUND OF THE INVENTION

1. Field of the Invention

The present invention relates to computer systems with a computer running multiple operating systems and more particularly to computer systems with a computer running multiple containerized (see DEFINITIONS section) operating systems to be respectively used by multiple terminals (see DEFINITIONS section).

2. Description of the Related Art

It is conventional to have a computer, such as a modified PC desktop type host computer, which controls and operates a plurality of terminals. In fact, mainframe computers dating back to at least the 1970s operated in this way. More recently, each terminal has been given its own operating system and/or instance of an operating system. These kind of systems are herein called multi-terminal systems.

It is conventional to use a hypervisor to run multiple operating systems on a single computer. A hypervisor (or virtual machine monitor) is a virtualization platform that allows multiple operating systems to run on a host computer at the same time. Some hypervisors take the form of software that runs directly on a given hardware platform as an operating system control program. With this kind of hypervisor, the guest operating system runs at the second level above the hardware. Other hypervisors take the form of software that runs within an operating system environment.

Hypervisors have conventionally been used in multi-terminal systems where each terminal has a dedicated guest operating system on a single host computer. In these conventional multi-terminal systems, I/O devices communicate I/O data through the hypervisor to perform basic I/O operations (see DEFINITIONS section). More specifically: (i) data from the I/O devices is communicated through the hypervisor to the computing hardware of the host computer; and (ii) from the computing hardware (if any) is communicated through the hypervisor to the I/O devices. Because the hypervisor is a virtualization platform, this means that the I/O devices must be virtualized in the software of the hypervisor and/or the guest operating system so that the communication of I/O data through the hypervisor can take place.

FIG. 1 shows prior art computer system 100 including: desktop PC 102 and four terminals 104a, 104b, 104c and 104d. Desktop PC 102 includes: video card 110; I/O ports 112; CPU 114; host operating system ("OS") 116; virtualizing middleware 118, four guest OS's (see DEFINITIONS section) 120a, 120b, 120c, 120d; and four guest applications 122a, 122b, 122c and 122d. Each terminal 104 includes: display 130 and keyboard-mouse-audio ("KMA") devices 132. Host OS may be any type of OS, such as Windows, Apple or POSIX (see DEFINITIONS section). As shown in FIG. 1, host OS 116 runs at security level (see DEFINITIONS section) L0, which may be, for example in an x86 CPU architecture, Ring Zero. This means that host OS 116 exchanges instructions directly with CPU 116 in native form (see DEFINITIONS section).

The guest OS's 120a, 120b, 120c, 120d are used to respectively control the four terminals 104a, 104b, 104c, 104d. This means that the four guest OS's: (i) control the visual displays respectively shown on displays 130a, 130b, 130c, 130d; (ii) receive input from the four keyboards 132a, 132b, 132c, 132d; (iii) receive input from the four mice 132a, 132b, 132c, 132d; and (iv) control audio for the four audio output devices (for example, speakers, headphones) 132a, 132b, 132c, 132d. The four guest OS's 120a, 120b, 120c, 120d are containerized virtual machines so that work by one user on one terminal does not affect or interfere with work by another user on another terminal. As shown in FIG. 1, they can respectively run their own application(s) 122a, 122b, 122c, 122d in an independent manner.

However, the four guest OS's are virtual machines, running at a security level 13, which is above the OS security level (see DEFINITIONS section) L0. For example, in an x86 architecture, the guest OS's 120a, 120b, 120c, 120d would be running at Ring Three. This is an indirect form of communication with the CPU 114. Furthermore, the instructions exchanged between the guest OS's and the CPU are virtualized by virtualizing middleware 118, which may take the form of a hypervisor or virtual machine manager ("VMM"). For example, some of the exchanged instructions relate to basic I/O operations. When the exchanged instructions are virtualized by virtualizing middleware 118, the instructions are taken out of their native form and put in a virtualized form. This virtualized form is generally a lot more code intensive than native form. This virtualization makes operations slower and more prone to error than similar exchanges between a host OS, running at the OS security level and the CPU.

US patent application 2004/0073912 ("Meza") discloses a system and method for automatically detecting the attachment of a peripheral device to a host system, and configuring the host system for communication with the peripheral device. In Meza, advertisements or other relevant information about the peripheral device or the host system is displayed to a user, when the host system detects the attachment of the device. In Meza, a host includes a USB hub to which device attaches via a pipe. Hubs are wiring concentrators that define an attachment point in a bus (for example, USB) architecture. An attachment point in Meza is typically an addressing scheme that corresponds with a unique identifier which allows the host to communicate with the attached peripheral. In Meza, attachments points are also referred to as ports. The USB device can be attached to one or more ports on the USB hub. When the USB device attaches to the host, an embedded hub (that is, root hub) at the host senses the presence of device on a port and interrogates the USB device for identifying information.

US patent application 2007/0043928 ("Panesar") discloses a method of giving virtual machines (VMs) direct access to USB devices with a combination hardware and software solutions. The USB host controller replaces device identifiers assigned by the VM with real device identifiers that are unique in the system. The real device identifiers are assigned by the VMM or the host controller.

US patent application 2007/0174410 ("Croft") discloses a computer system for incorporating remote windows from remote desktop environments into a local desktop environment. In the Croft system: (i) a first virtual channel is coupled to a remote desktop environment provided by a virtual machine; (ii) a second virtual channel is coupled to the remote desktop environment; and (iii) a local agent is coupled to the remote desktop environment via the first and second virtual channels. The first virtual channel conveys graphical data associated with a remote window provided by the remote desktop environment. The second virtual channel conveys window attribute data associated with the remote window provided by the remote desktop environments. The local agent directs the formation of a local window in the local desktop environment corresponding to the remote window provided by the remote desktop environment, the first local window displaying the graphical data conveyed by the first virtual channel in accordance with the window attribute data conveyed by the second virtual channel.

Other publications potentially of interest include: (i) US published patent application 2008/0092145 ("Sun"); (ii) US published patent application 2006/0267857 ("Zhang"); (iii) US patent application 2007/0174414 ("Song"); (iv) Applica PC Sharing Zero Client Network Computing Remote Workstation powered by Applica Inc. (see www.applica.com website, cached versions 31 Jul. 2007 and earlier); (v) US patent application 2003/0018892 ("Tello"); (vi) US patent application 2007/0097130 ("Margulis"); (vii) US patent application 2008/0168479 ("Purtell"); (viii) U.S. Pat. No. 5,903,752 ("Dingwall"); (ix) US patent application 2007/0028082 ("Lien"); (x) US patent application 2008/0077917 ("Chen"); (xi) US published patent application 2007/0078891 ("Lescouet"); (xii) US published patent application 2007/0204265 ("Oshins"); and/or (xiii) US published patent application 2007/0057953 ("Green").

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

BRIEF SUMMARY OF THE INVENTION

The present invention is directed to a computer system having a host computer and multiple terminals. The host computer (including any peripheral hubs or the like) has groups of at least three I/O ports (preferably USB ports) where the I/O ports of a single group are supposed to be used to connect I/O devices associated with a single terminal. When connecting up a new terminal, after a user connects two I/O devices into a group and affirmatively indicates, by user input, that these belong to the same terminal, then further devices subsequently connected into the same group of I/O ports will be automatically assigned to the terminal previously indicated by the user.

The present invention is further directed to a computer system where multiple operating systems are respectively used to control multiple displays. A video output module creates a master frame display including display data for (at least) the displays of all of the operating systems. The master frame display is split into portions respectively corresponding to each operating system.

The present invention is further directed to multi-sharing software cursors (modified event device). A modified LINUX kernel creates a software cursor for each input device, hides the hardware cursor and allows multiple monitors to be concurrently used. Preferably this is accomplished by modified EVDEV—event device. Note that EVDEV is based on open source and not modularized, but a unique aspect is the installation script (copyrightable) that allows the EVDEV to be used in a manner for which it was not designed, specifically controlling/handling multiple software cursors.

The present invention is further directed to multi-sharing with separate desktops for the software cursor (modified Zephyr). A modified LINUX kernel associates the same device (KMA) with a different control file.

The present invention is further directed to an I/O port cube (or other hub shape) for connecting keyboards, mice and speakers of one or more workstations or terminals. One preferred embodiment is a four-port hub with two USB sound adaptors. This device can be structured to connect two, three or more workstations to the cube. It may be possible to push video over USB and/or through the cube. The cube may also become a wireless transmission component. Preferably, two workstations are connected at each cube.

Various embodiments of the present invention may exhibit one or more of the following objects, features and/or advantages:

(1) easier way for users to connect multiple terminals up to a single computer;

(2) connection of terminal hardware for multiple terminal less prone to human error resulting in data being intended for use in connection with one terminal ends up being sent to and/or received from a user at a different terminal; and/or (3) efficient way of generating separate multiple displays from a single set of processing hardware.

According to an aspect of the present invention, there is a method of connecting a terminal to a computer. The method includes the steps of: (a) providing a computer having a plurality of I/O ports, with the I/O ports having a hierarchical organization having at least a root level with a single logical I/O port, and a terminal connection level hierarchically below the root level having a plurality of physical I/O ports; (b) logically grouping, by the computer, the terminal connection level I/O ports into a plurality of groupings, with each grouping including at least three terminal connection level I/O ports; (c) subsequent to step (b), connecting an I/O device into a first terminal level I/O port that is in a first grouping of the plurality of groupings; (d) subsequent to step (c), indicating by user input that the I/O device connected at the first terminal level I/O port corresponds to a first terminal; (e) subsequent to step (b), connecting a second I/O device into a second terminal level I/O port that is in a first grouping of the plurality of groupings; (f) subsequent to step (e), indicating by user input that the I/O device connected at the second terminal level I/O port corresponds to the first terminal; (g) subsequent to step (b), connecting a third I/O device into a third terminal level I/O port that is in a first grouping of the plurality of groupings; and (h) subsequent to step (f), automatically assigning, by the computer, the third device as belonging to the first terminal.

According to a further aspect of the present invention, there is a computer system for use with a first I/O device, a second I/O device and a third I/O device. The system includes a multiple containerized operating systems; multiple physical I/O ports; and a terminal assignment module. the terminal assignment module is structured and/or programmed to: (i) logically grouping the physical I/O ports into a plurality of groupings, including a first grouping, with each grouping including at least three physical I/O ports; (ii) receive a first user input indicating that the first I/O device connected at a first physical I/O port in a selected grouping corresponds to a first operating system of the plurality of containerized operating systems; (iii) receive a second user input indicating that the second I/O device connected at a second physical I/O port in the selected grouping corresponds to the first operating system; and (iv) automatically assign the third I/O device connected at a third physical I/O port in the selected grouping to the first operating system.

According to a further aspect of the present invention, a computer system includes a processing module, a first operating system, a second operating system and a video output module. The processing module is structured and/or programmed to create a master display frame data. The video output module includes a multiple video outputs. Each video output is structured and electrically connected to output a respective video signal suitable for generating a display on a display device. The video output module is electrically connected and/or programmed to receive the master display frame data from the processing module, to identify a first portion of the master display frame data as corresponding to the first operating system, to identify a second portion of the master display frame data as corresponding to the second operating system, to output the first portion on a first video output of the plurality of video outputs and to output the second portion on a second video output of the plurality of video outputs. The first video output is different than the second video output. The first portion is different from and not substantially overlapping with the second portion.

BRIEF DESCRIPTION OF THE DRAWINGS

The present invention will be more fully understood and appreciated by reading the following Detailed Description in conjunction with the accompanying drawings, in which:

FIGS. 5A, 5B, 5C and 5D are a flowchart of a first embodiment of a method according to the present invention;

FIG. 6 is a of a second embodiment of a computer system according to the present invention;

FIG. 11 is a schematic of a fourth embodiment of a computer system according to the present invention.

DETAILED DESCRIPTION OF THE INVENTION

Figure 1:
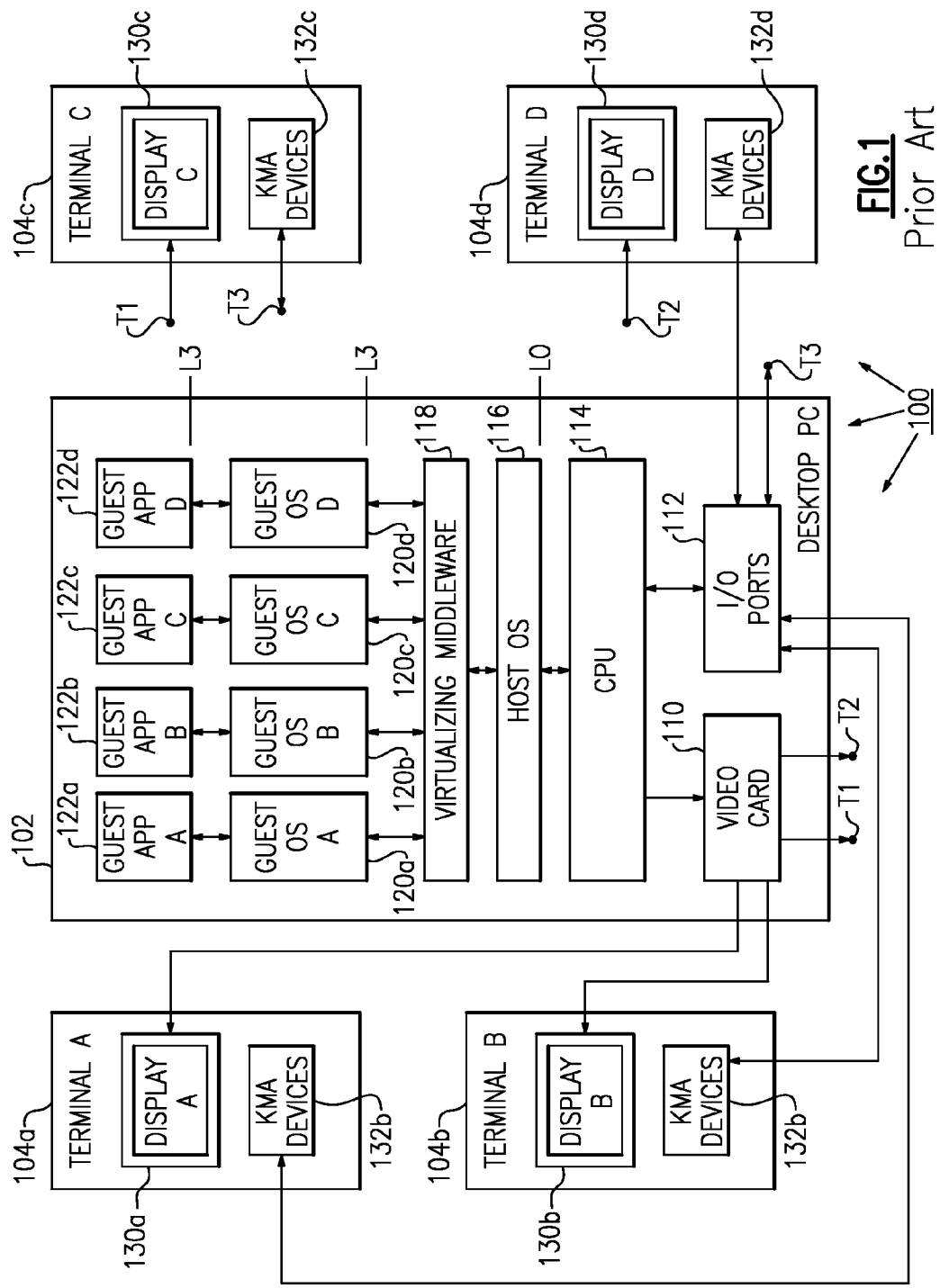
FIG. 1 is a schematic of a prior art computer system.
Figure 2:
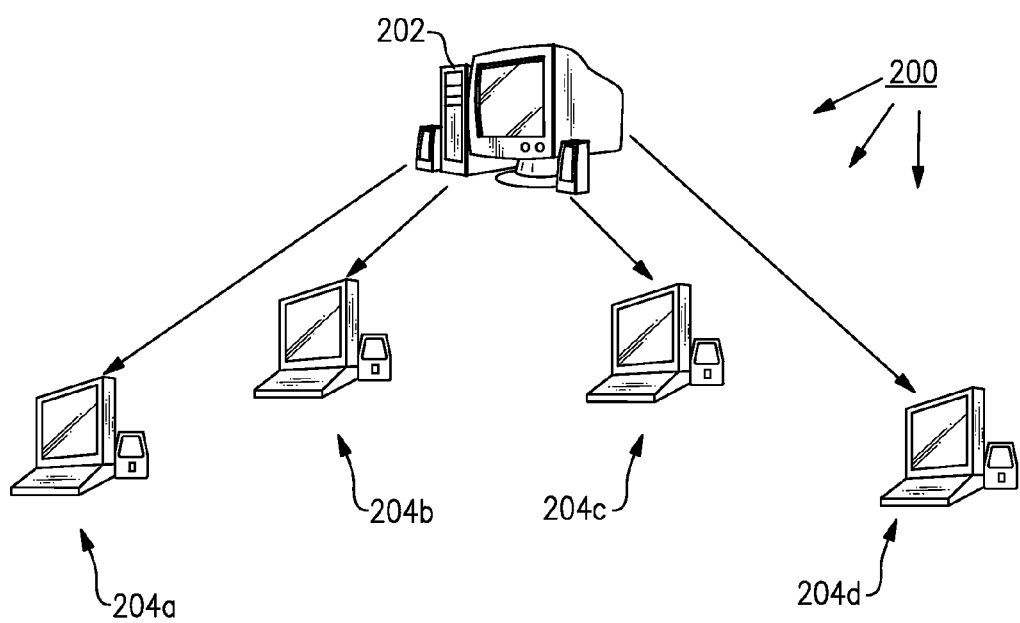
FIG. 2 is a perspective external view of a first embodiment of a computer system according to the present invention.

FIG. 2 shows computer system 200 according to the present invention, including desktop PC 202 and four terminals 204a, 204b, 204c and 204d. Desktop PC 202 could alternatively be any other type of computer now known or to be developed in the future, such as a laptop, a tablet, a mini computer, a mainframe computer, a super computer, a blade, etc. Terminals 204 each includes I/O devices in the form of a display, a keyboard, a mouse and an audio device. The display is the primary output device and may be any type of display now known or to be developed in the future, such as an LCD display or a CRT display. Alternatively or additionally, other output devices could be present, such as printers, lights (LEDs) and/or vibrating output devices. The keyboard, mouse and audio speakers are the primary input devices, but they may include output capabilities as well. Alternatively or additionally, there may be other output devices of any type now known or to be developed in the future, such as drawing tablets, joysticks, footpads, eyetracking input devices, touchscreens, etc.

Preferably, the display of each terminal 204 is connected to be in display data communication with desktop PC 202 by a standard parallel display connection, but may be connected by any appropriate data connection now known or to be developed in the future, such as a wireless connection. Preferably, the input devices of terminal 204 are connected to desktop PC 202 by a USB connection. Alternatively, they may be connected by any means now known or to be developed in the future, such as PS2 connection or wireless connection. One or more USB hubs may be used between desktop PC 202 and the input devices of terminals 204.

Terminals 204 are preferably ultra thin terminals (see DEFINITIONS section). Alternatively, some or all terminals 204 could include a client computer with memory and processing capability. Terminals 204 may also include an I/O port for a portable memory, such as a USB port for a detachably attachable USB flash memory or jump drive.

Figure 3:
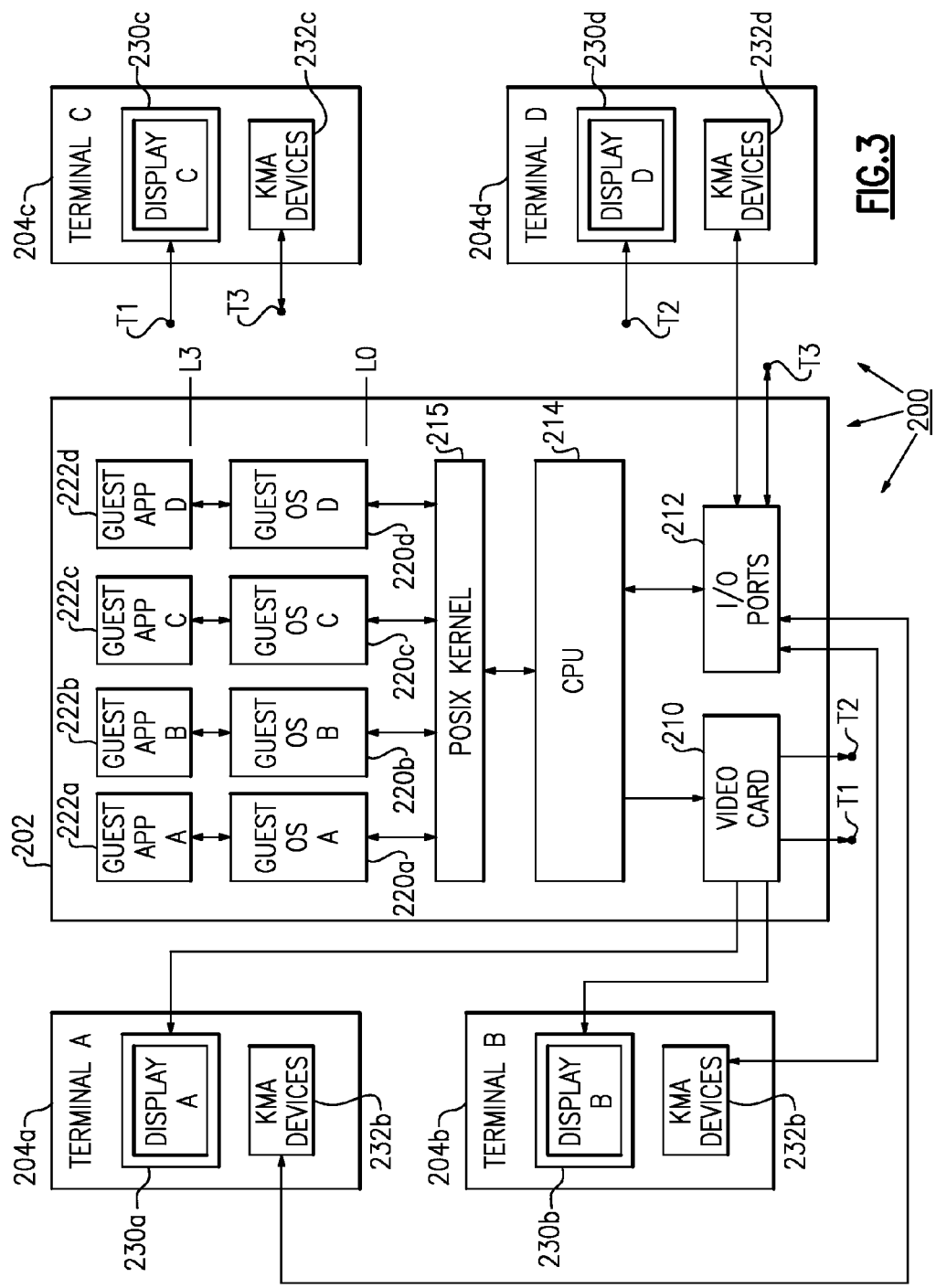
FIG. 3 is a schematic of the first embodiment computer system.

FIG. 3 is a schematic of system 200 including desktop PC 202; terminals 204; video card 210; I/O ports 212; CPU 214; POSIX kernel 215; four guest OS's 220a, 220b, 220c, 220d; four guest applications 222a, 222b, 222c, 222d; four displays 230a, 230b, 230c, 230d; and four sets of KMA devices 232a, 232b, 232c, 232d.

Video card 210 has at least four outputs to supply display data to the four display devices 230a, 230b, 230c, 230d. Although not shown, video card 210 may have at least one additional output for: (i) additional terminals; and/or (ii) use with the POSIX kernel and/or any host operating system that may be present. The video card may take the form of multiple video cards.

The CPU may be any type of processing hardware, such as x86 architecture or other Windows type, Apple type, Sun type, etc. The hardware structure of the CPU will determine the native form for the instructions that it gives and receives. For this reason, the guest OS's 220a, 220b, 220c, 220d must be fully compatible with CPU 214. Importantly, there is substantially no virtualizing middleware layer in desktop PC 202 to correct for any incompatibilities.

The POSIX kernel is preferably a LINUX kernel because LINUX is open source and also because a LINUX kernel can be expanded to run LINUX applications. Alternative, the kernel may be written in other formats to be compatible with the CPU such as Windows or BSD.

The PC 202 preferably includes a software algorithm (not shown) that loads the POSIX kernel (Linux 2.6 preferably) onto an available motherboard EEPROM instead of the currently installed proprietary BIOS. The kernel, along with several other helpful C based programs preferably run in 32 bit mode, as opposed to the current method of running the BIOS in 16 bit mode. These programs preferably include BusyBox, uClibc, and XII. The result is a greatly decreased boot time. All of this is preferably run in the cache memory of the CPU instead of normal DRAM. The reason for this is that DRAM is normally initialized by the BIOS and can't be used until it is initialized. The first program that runs is also written in C and it is what initializes and uses this CPU memory.

Once this is loaded, a larger module is called. This would typically be invoked from the hard drive. The POSIX kernel 215 does not necessarily have any sockets or run any applications. It may only runs sub-modules that control multiple video, keyboard, mouse, and the audio devices for multiple, concurrent local connections. Current technology will allow only one user to use the system at a time using one set of keyboard, mice, and monitors. These modules have been modified to allow multiple inputs (keyboards and mice) and outputs (audio and video) devices to be used independently and concurrently. Preferably, the terminals 204 are not remotely located, but, in some embodiments of the invention, they may be.

Preferably, the terminals are located on the same machine and the output goes directly via the system bus to the associated devices resulting in multi-user system with very little slow-down. It utilizes the excess CPU power that is available to control multiple sessions just like in a "thin client" environment. The difference is that in a "thin client" environment the output is converted to TCP-IP protocol and sent via a network connection. This conversion and packeteering of video results in slow screen redraws. In preferred embodiments of the present invention the more direct transfer of video data eliminates slow screen redraws. This ability to run multiple "sessions" is currently available with Linux (XII) and Windows (RDP), on remote machines but the remote machines must have the necessary hardware and software necessary to locally control the keyboard, mouse, audio and video devices. Because everything is preferably loaded from the local EEPROM, boot up from power-on to login is approximately 6 seconds. This compares favorably to current Windows, MacIntosh, or Linux startup times of 30-50 seconds.

These modifications allow for a natural separation of the "sessions" to a great degree. Because of this, the invention is able to take advantage of the scheduling components and modularity of Linux to use it as a supervisor for other operating systems to run concurrently. This can efficiently install one guest operating system (for example, a Windows guest OS) in conjunction with each set of keyboards, mice, and monitors.

Figure 7A:
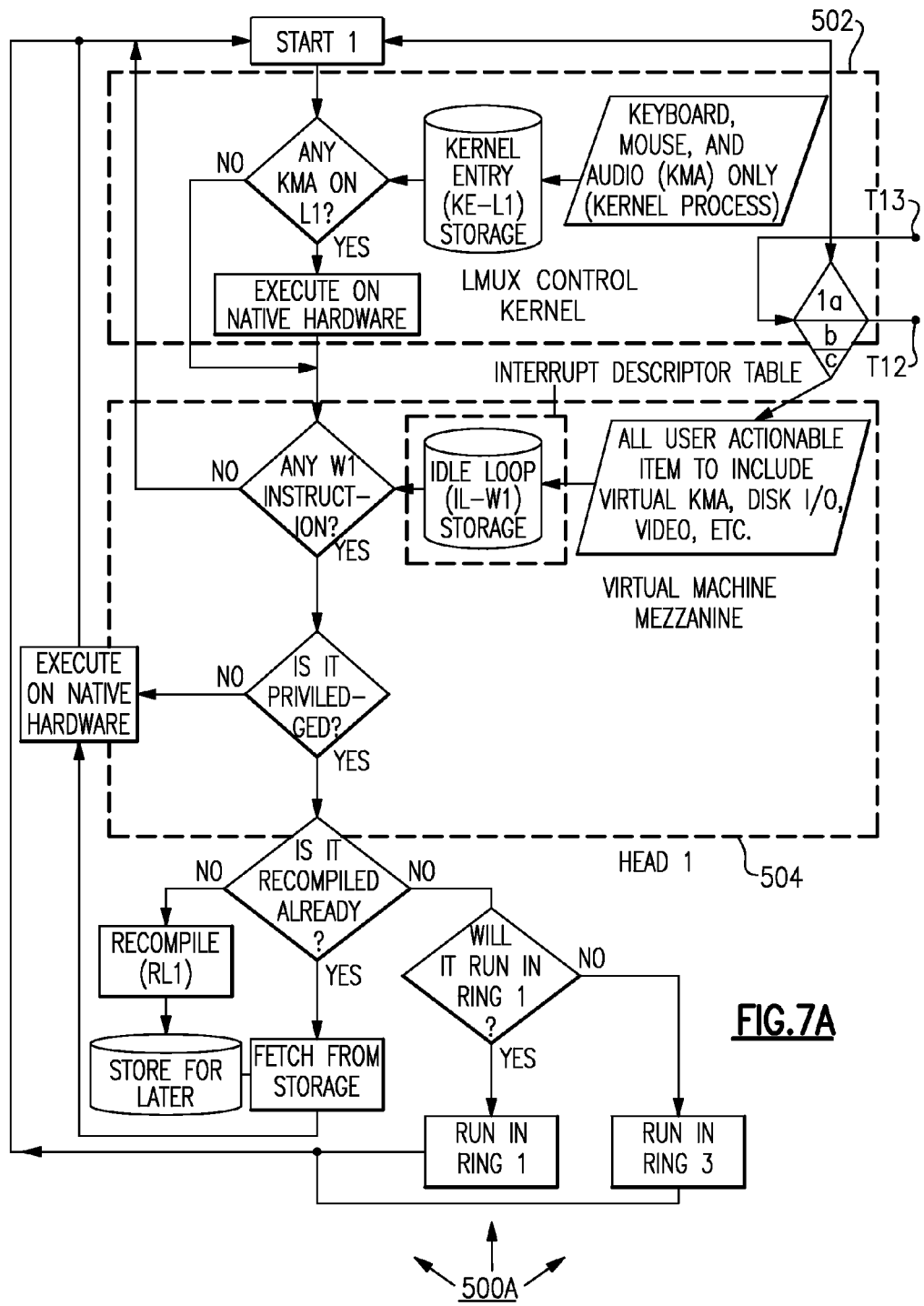
FIGS. 7A and 7B are a flowchart of a second embodiment of a method according to the present invention.
Figure 7B:
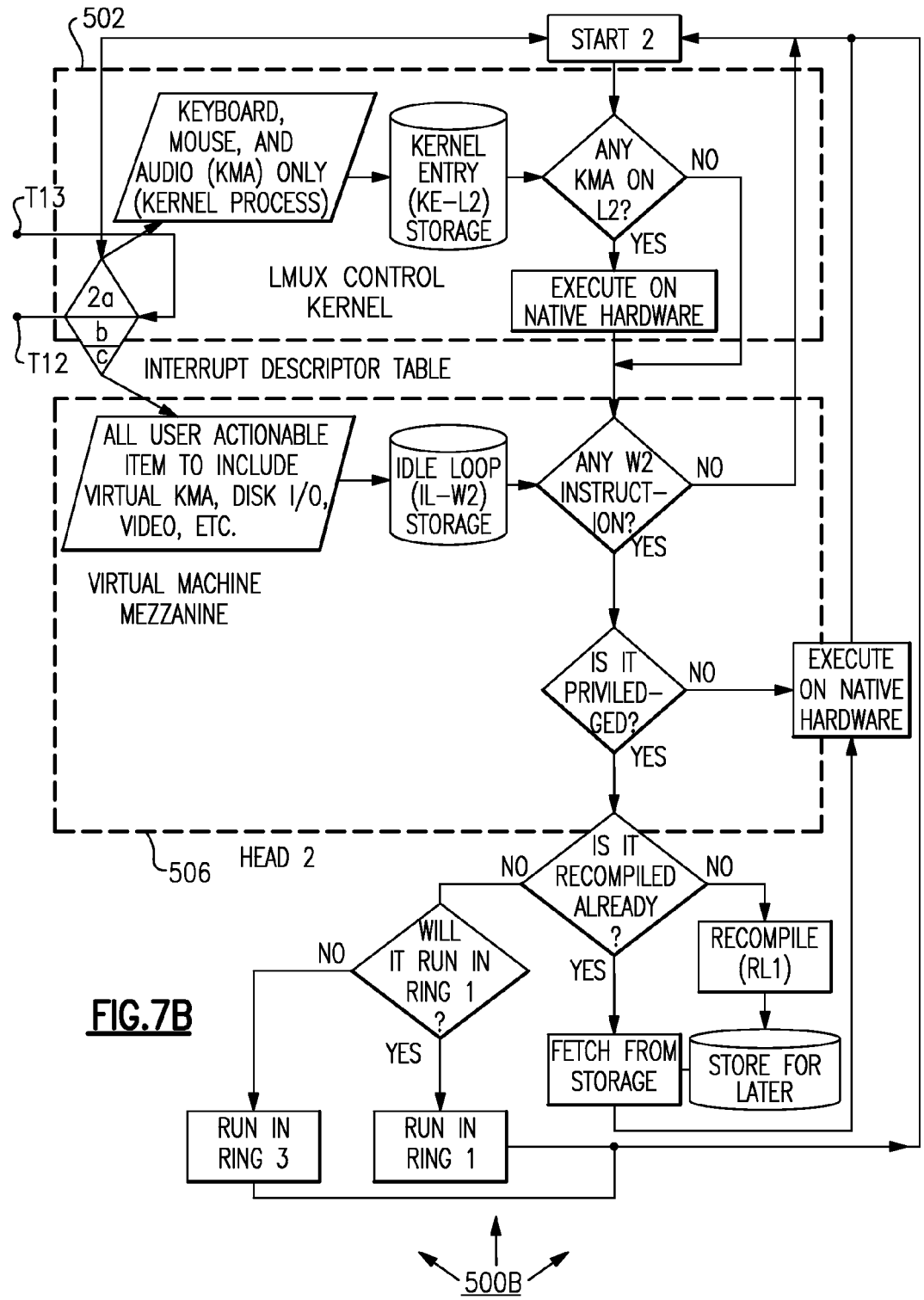

FIGS. 7A and 7B are a flowchart showing exemplary process flow for the exchange of instructions between the guest OS's 220 and the CPU 214 through the POSIX kernel 215 according to the present invention. This flowchart will now be discussed in narrative terms, after which discussion, FIG. 3 will be further discussed. Using a modified Linux interrupt service code, . . . /kernel/entry-v.s, the idle loop, . . . /kernel/process.c, and a modified Interrupt Descriptor Table, this can control and tell if a system "session" is: (i) running; (ii) not running; or (iii) pre-empted. The kernel has priority for all actions, but since it is only providing low throughput I/O control and video rendering (video is mostly handled by the GPU on the video card), preemption by the host kernel is very low in proportion to time allowed for the "clients."

Since the architecture is the same for both the host (Linux kernel) and the local "client" (x86-32 bit or 64 bit) operating system, there is little need for emulation of hardware and most instructions can be run directly on the applicable hardware. All CPU requests can be dynamically scheduled by the controller kernel and run in Ring Zero of the machine. If a protected call, privileged instruction, system trap, or page fault is presented that will not run properly or does not have permission to run in this unified system then it is moved to Ring Three. Ring Three is normally unused on an Intel system. All memory calls are directed to protected and preallocated memory locations. All hardware except video, ethernet, and audio devices is directly accessed by the "client" OS. Video, ethernet, and audio devices are virtualized, off-the-shelf drivers. Raw I/O from these devices is sent through the modified Linux idle loop and Interrupt Descriptor Table to the "real" hardware in a prioritized fashion. This allows a number of segregated "sessions" to be run at near native speed.

This is done without hardware virtualization extension techniques as currently available with the Intel VT or AMD V/SVM CPU chips, hardware emulation (VMWARE, QEMU, Bochs, etc.), or hypervisors like Xen or KVM (these require modification of source code). Finally, products like Cooperative Linux and UserMode Linux work with Windows as the host and Linux as the "guest" because the guest in this case (Linux) can be modified to give up control of the hardware when Windows asks for it. Since Windows can't easily be modified this concept has not been realized in reverse, for example Linux as host and Windows as guest. This aspect of the present invention is the reverse of this in that Linux is the host and Windows is the guest.

It may be difficult to modify the guest OS (for example, Windows) to give up control when the host (supervisor) asks for it, we can use /kernel/process.c (idle loop) and /kernel/entry-v.s (interrupt service) and the Interrupt Descriptor Table to trap privileged instructions and force the guest (Windows) to wait, until it is no longer preempted. In other words, we have modified the controller kernel (Linux) to put the requests of the guest (Windows) into the Linux idle loop if the guest is preempted. Since the host is not running applications, since it is only controlling I/O, the wait time during this preemption period is very short and it is not apparent to the user. Finally, when privileged instructions are trapped to Ring Three, the instructions are recompiled (sometimes on the fly) using QEMU recompilation code so that the next time this situation repeats itself, the trap is not needed.

Now that the operation of POSIX kernel has been explained in detail, discussion will return to FIG. 3. The guest OS's 220 are preferably Windows OS's, such as Windows XP or Windows Vista. Alternatively, any type of guest OS now known or to be developed in the future may be used. In some embodiments of the invention, there will be but a single guest OS. For example, Windows Vista has been found to run faster when run through the POSIX kernel according to the present invention, and it is believed that other OS's (now known or to be developed in the future) would similarly run faster. In some embodiments of the invention, the guest OS's will be different from each other. For example, there may be a Windows XP OS, a Windows Vista OS, an Ubuntu LINUX OS and a BSD OS. Systems with multiple OS's may be preferred in embodiments of the present invention where there are not multiple terminals, but rather a single set of I/O devices connected to desktop PC 202 in the conventional way. In these single terminal embodiments, a single user can switch between various operating systems at will, taking advantage of native applications 222 for a variety of operating systems on a single physical machine.

Figure 4:
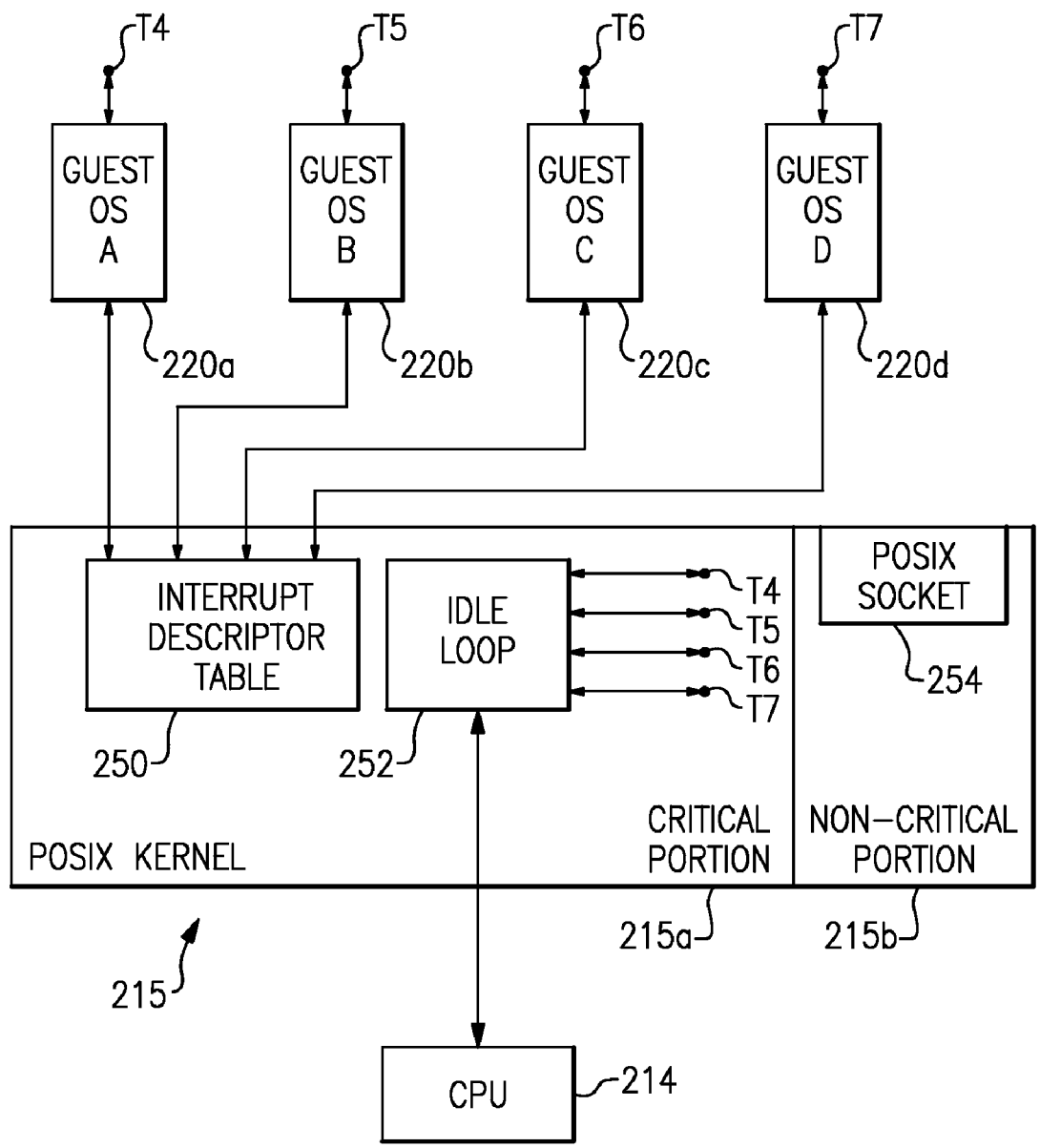
FIG. 4 is a more detailed schematic of a portion of the first embodiment computer system.
Figure 5A:
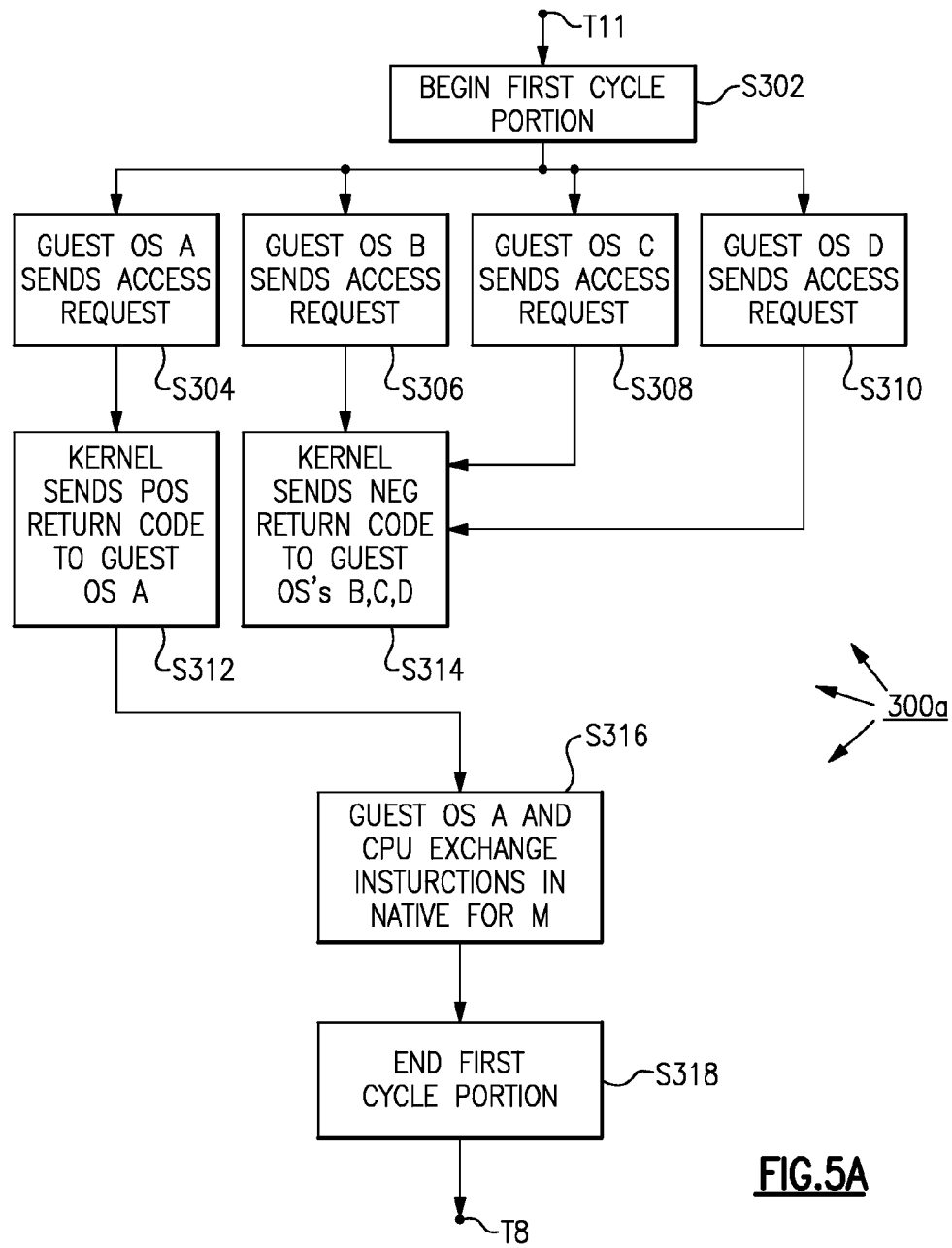
Figure 5B:
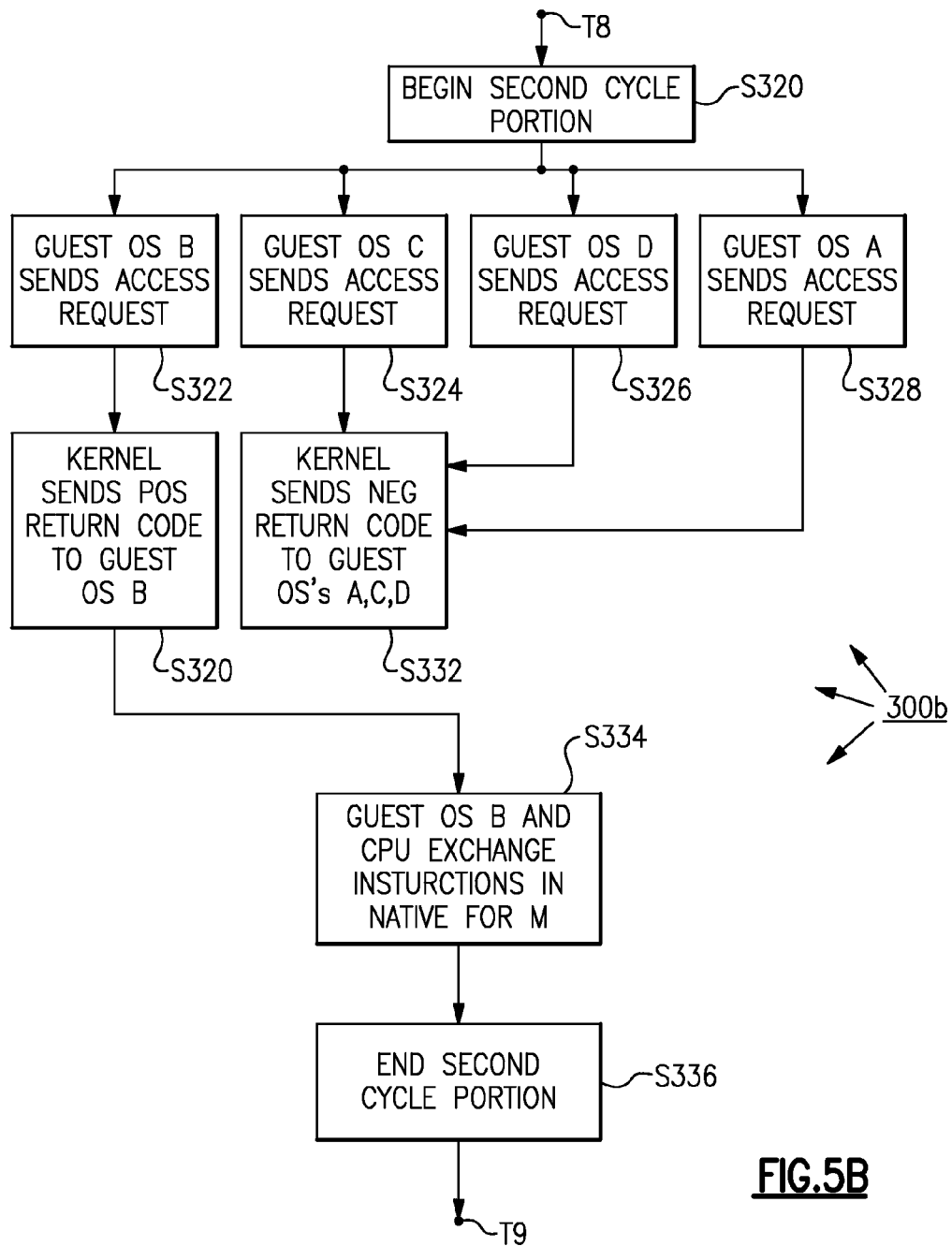
Figure 5D:
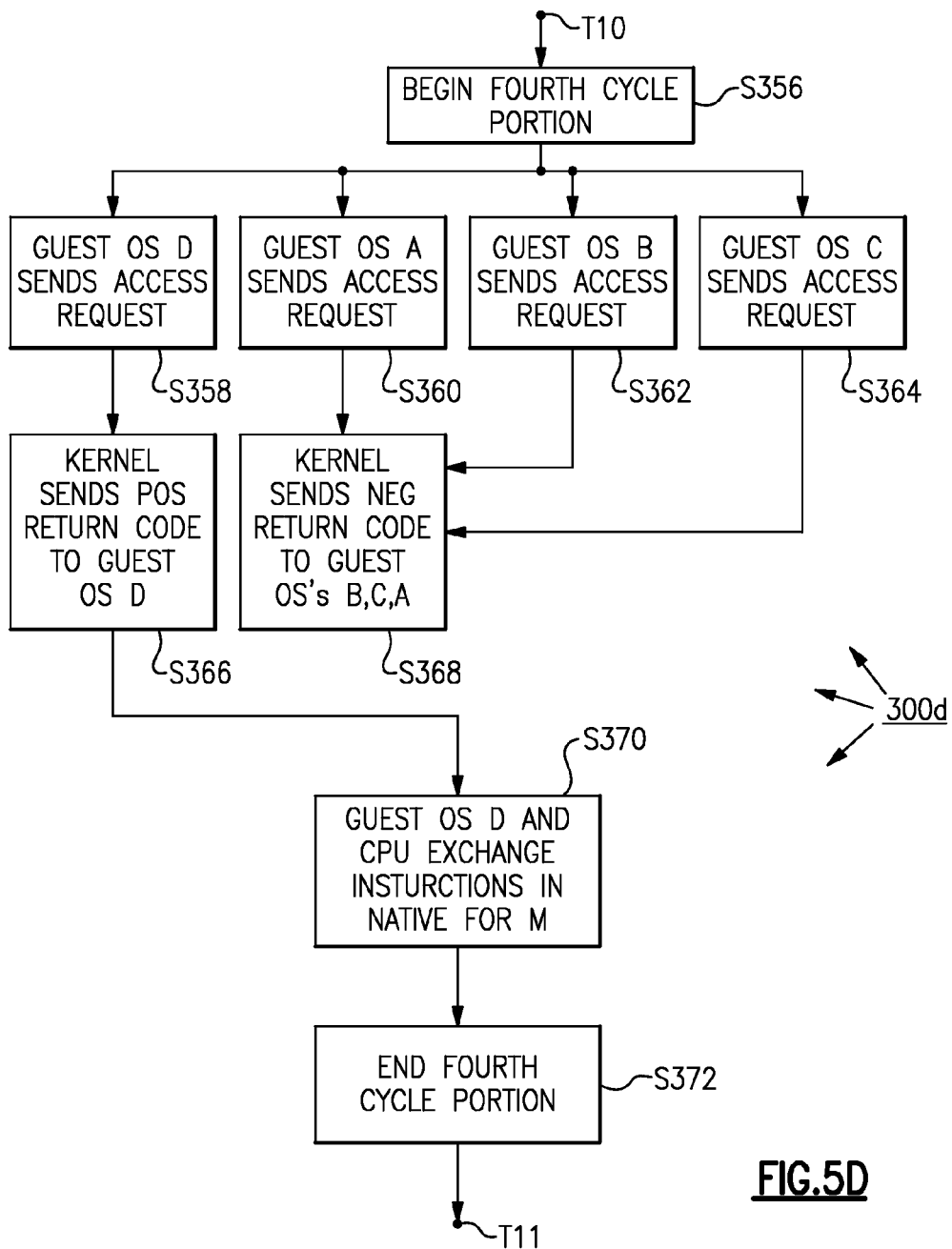

FIG. 4 shows a more detailed schematic of POSIX kernel 215 including: critical portion 215a; non-critical portion 215b; interrupt descriptor table 250; idle loop 252; and POSIX socket 254. Critical portion 215a is critical because this is the portion that passes instructions in native form between CPU 214 and guest OS's 220. In a sense, critical portion 215a takes the place of the virtualizing middleware of the prior art, with the important differences that: (i) the POSIX kernel passes instructions in native form, rather than translating them into virtualized or emulated form at intermediate portions of the exchange; and/or (ii) the POSIX kernel permits the guest OS's to run at an OS security level (for example, Ring Zero or Ring One), rather than a higher security level (see FIG. 3 at reference numeral L0). It is noted that applications running on top of the guest OS's will run at a higher security level (see FIG. 3 at reference numeral L3), such as, for example, Ring Three. In other words, despite the presence of the kernel, guest OS's run at the security level that a host OS would normally run at in a conventional computer.

In this preferred embodiment of the present invention, the POSIX kernel accomplishes the exchange of native form instructions using interrupt descriptor table 250 and idle loop 252. Interrupt descriptor table 250 receives requests for service from each of the guest OS's. At any given time it will return a positive service code to one of the guest OS's and it will return a negative service code to all the other guest OS's. The guest OS that receives back a positive return code will exchange instructions in native form with the CPU through idle loop 252. The other guest OS's, receiving back a negative return code from interrupt descriptor table 250 will be preempted and will remain running until they get back a positive return code.

Preferably, and as shown in the flow chart of FIGS. 5A to D, the interrupt descriptor table cycles through all the guest OS's over a cycle time period, so that each guest OS can exchange instructions with the CPU in sequence over the course of a single cycle. This is especially preferred in embodiments of the present invention having multiple terminals, so that different users at the different terminals under control of their respective guest OS's can work concurrently. Alternatively, the interrupt descriptor table could provide for other time division allocations between the various guest OS's. For example, a user could provide user input to switch between guest OS's. This form of time division allocation is preferred in single terminal, multiple operating system embodiments. There may be still other methods of time division allocation, such as random allocation (probably not preferred) or allocation based on detected activity levels at the various terminals.

Non-critical portion 215b shows that the controller kernel may be extended beyond the bare functionality required to control the exchange of instructions between the guest OS's and the CPU. For example, a POSIX socket may be added to allow POSIX applications to run on the kernel itself. Although the kernel is called a kernel herein, it may be extended to the point where it can be considered as a host operating system, but according to the present invention, these extensions should not interfere (that is virtualize or emulate) instructions being exchanged through the kernel in native form between the guest OS(es) and the CPU.

FIGS. 5A to 5D show an embodiment of process flow for one cycle for the exchange of instructions in native form between guest OS's 220 and CPU 214 through a kernel including an interrupt descriptor table and an idle loop. The process includes: a first portion (steps S302, S304, S306, S308, S310, S312, S314, S316, S318); a second portion (steps S320, S322, S324, S326, S328, S330, S332, S334, S336); a third portion (steps S338, S340, S342, S344, S346, S348, S350, S352, S354); and a fourth portion (steps S356, S358, S360, S362, S364, S366, S368, S370, S372).

The cycle has four portions because four guest OS's (and no host OS's) are running—each portion allows the exchange of instructions between one of the four guest OS's and the CPU so that all four operating systems can run concurrently and so that multiple users can respectively use the multiple operating systems as if they had a dedicated computer instead of an ultra thin terminal.

Preferably, the entire cycle allows each OS to get a new video frame about every 30 microseconds (MS). In this way, each terminal display gets a about 30 frames per second (fps), which results in a smooth display. Above 30 frames per second, there is little, if any, improvement in the appearance of the video, but below 30 fps, the display can begin to appear choppy and/or aesthetically irritating. Because the cycle time, in this four portion embodiment is preferably about 30 MS to maintain a good 30 fps frame rate in the displays, this means that each cycle portion is about 30/4 MS, which equals about 8 MS. With current CPUs, 8 MS out of 30 MS is sufficient to handle most common applications that would be run at the various guest OS's, such as word processing, educational software, retail kiosk software, etc. As CPU's get faster over time, due to improvements such as multiple cores, it will become practical to have a greater number of guest operating systems on a single desktop computer—perhaps as many as 40 OS's or more.

FIG. 6 is a schematic of a second embodiment computer system 400 according to the present invention including: guest OS 402a; guest OS 402b; guest OS 402c; guest OS 402d; hardware control sub-modules 408; controller kernel 410; hard drive 414; hardware layer; and EEPROM 418. Hardware control sub-modules 408 include the following sub-modules: network interface card (NIC) 434; keyboard 436; mouse 438; audio 440; video 442, memory 444 and CPU 446. Controller kernel 410 includes the following portions: kernel process module 448; kernel entry module 450; idle loop 452; interrupt service code 454; and interrupt descriptor table 456. Hardware layer 416 includes the following portions: network interface card (NIC) 420; keyboard 422; mouse 424; audio 426; video 428, memory 430 and CPU 432.

As shown by the guest OS boxes 402, the operating systems are containerized. As shown schematically by arrow 404, the presentation layer in this embodiment is Windows. As shown schematically by arrow 406, there are OS containers and virtual drivers for NIC, audio and video. Additionally, there may be additional modules, such as video acceleration modules. The hardware control sub-modules 408 are direct access drivers and may additionally include other sub-modules, such as a video acceleration module. The EEPROM 418 is the normal location for BIOS, but in this embodiment of the present invention is loaded with the controller kernel 410 and X11. EEPROM 418 invokes the hard drive after the initial boot up. The control kernel is invoked from hard drive 414 during the original EEPROM 418 boot. At the NIC portion 420, it is noted that each card preferably has its own MAC address and own IP address.

FIGS. 7A and 7B, discussed above, show a more detailed embodiment of the process flow through an interrupt descriptor table and idle loop in a LINUX controller kernel according to the present invention. FIGS. 7A and 7B include LINUX control kernel level steps 502; Head 1 steps 504 and Head 2 steps 506.

Figure 8:
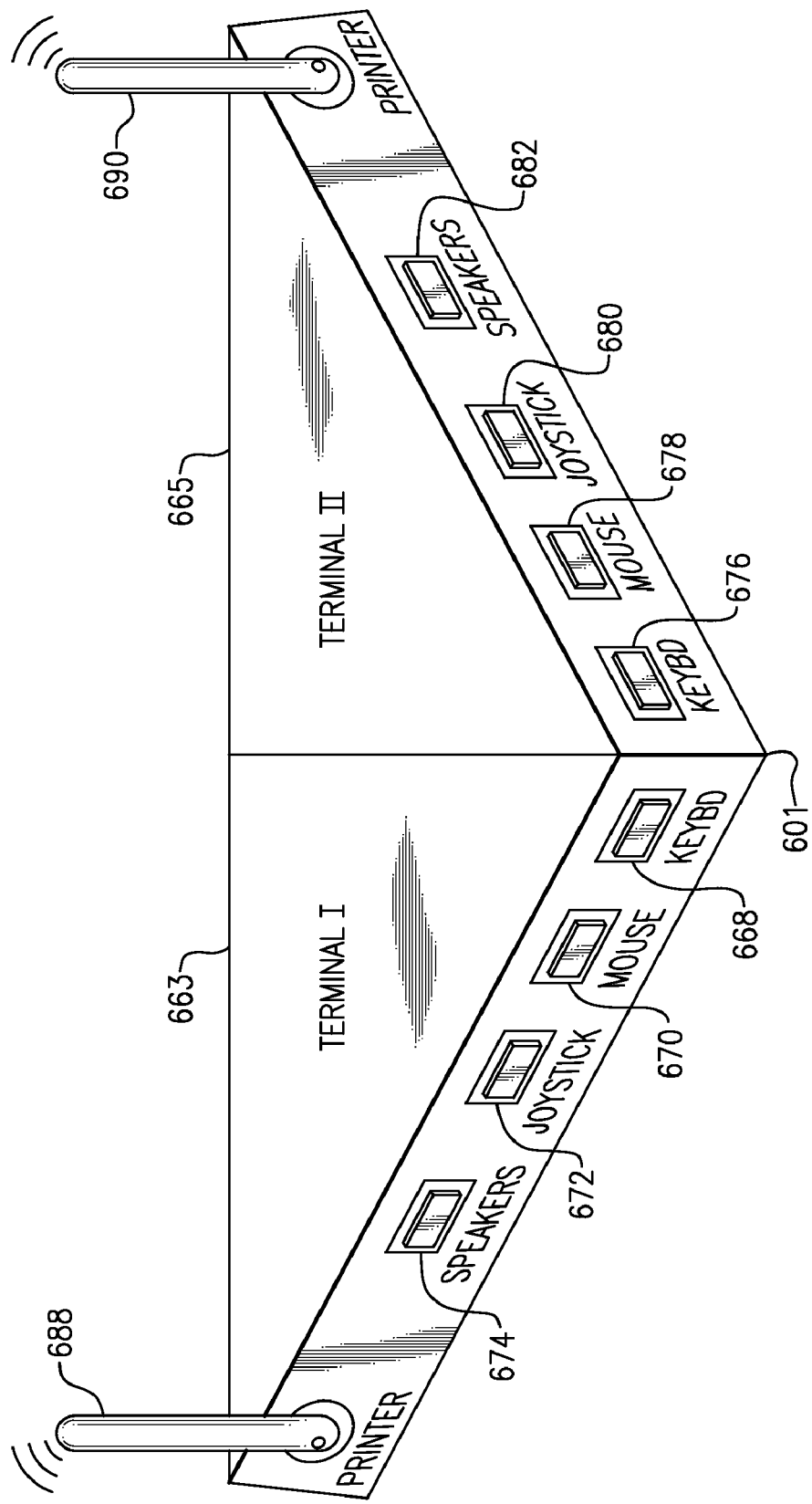
FIG. 8 is a perspective view of a USB hub according to the present invention.

FIG. 8 shows a set of I/O ports 601 according to the present invention including: terminal I ports group 663 and terminal II ports group 665. The set of I/O ports is connected to be in data communication with a computer having at least two containerized operating systems. For example, the connection may include or be constituted by a USB cable. As a further example, the connection could be wireless. As shown in FIG. 8, the ports for each terminal are intended to accommodate the following I/O devices: keyboard, mouse, joystick, speakers and wireless printer. This is only an example. The set of ports could include fewer devices or more devices. Also, the ports do not need to be labeled with their intended device. For example, because of the way USB ports are set up, a mouse could be plugged into the keyboard port and vice versa. However, the labeling is shown in this embodiment 601 to help provide a mental picture for the terminal connection processes that will be discussed below.

Figure 9:
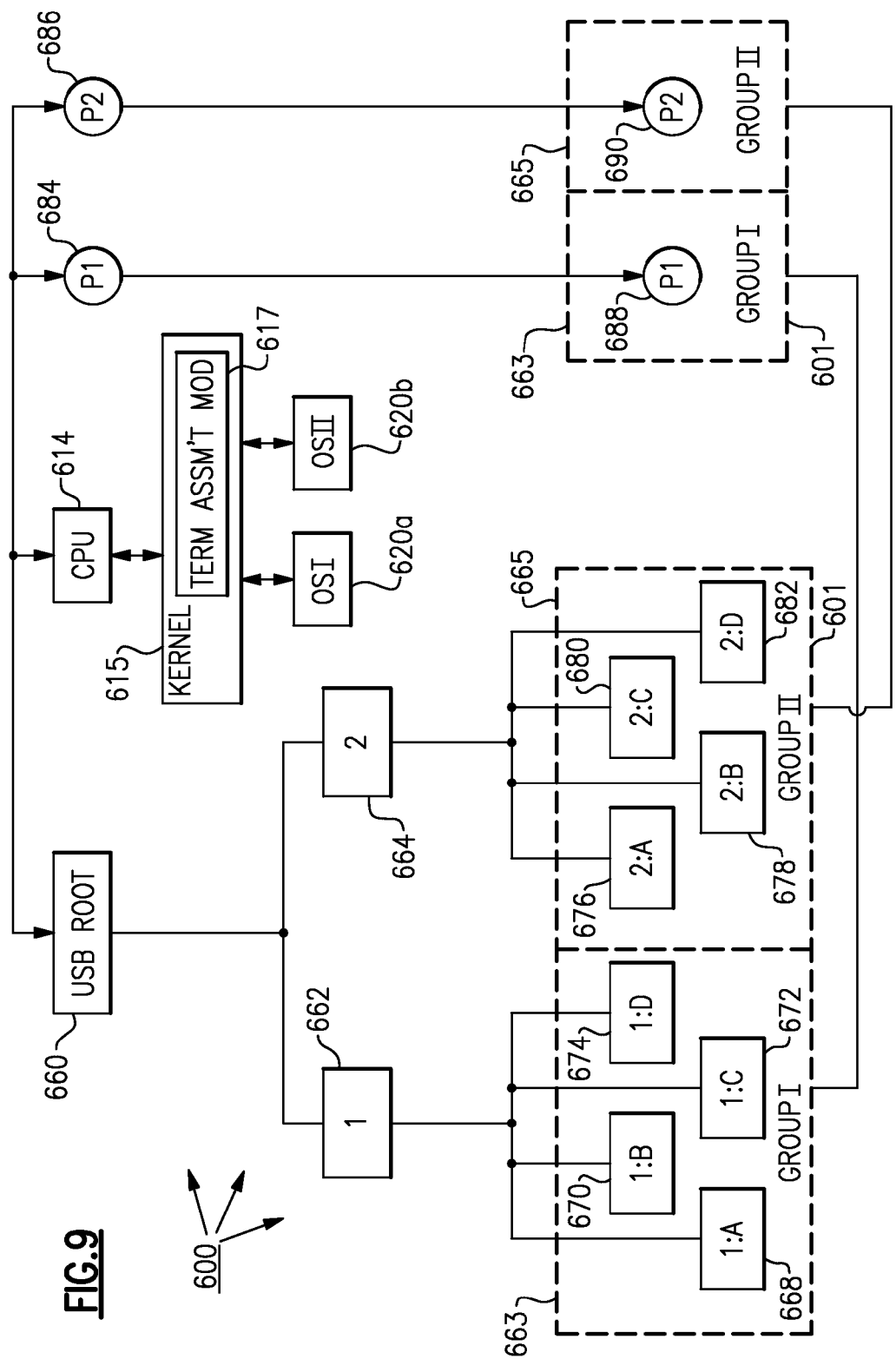
FIG. 9 is a schematic of a third embodiment of a computer system according to the present invention.

Before moving to the terminal connection processes of the present invention, computer system 600 according to the present invention will now be discussed in connection with FIG. 9. As shown in FIG. 9, system 600 includes: CPU 614; controller kernel 615; guest operating system I 620a; guest operating system II 620b; USB root 660; USB address 1 port 662; USB address 2 port 664; USB address 1A port 668; USB address 1B port 670; USB address 1C port 672; USB address 1D port 674; USB address 2A port 676; USB address 2B port 678; USB address 2C port 680; USB address 2D port 682; in-computer wireless printer address P1 port 684; in-computer wireless printer address P2 port 686; peripheral wireless printer address P1 port 688; peripheral wireless printer address P2 port 690. The follow components of system 600 are preferably located at or on a desktop PC: CPU 614; controller kernel 615; guest operating system I 620a; guest operating system II 620b; USB root 660; USB address 1 port 662; USB address 2 port 664; in-computer wireless printer address P1 port 684; in-computer wireless printer address P2 port 686. As shown in FIG. 8, the following components are located in a peripheral device called set of I/O ports 601: USB address 1A port 668; USB address 1B port 670; USB address 1C port 672; USB address 1D port 674; USB address 2A port 676; USB address 2B port 678; USB address 2C port 680; USB address 2D port 682; peripheral wireless printer address P1 port 688; peripheral wireless printer address P2 port 690. The kernel includes terminal assignment module 617.

The desired set-up in system 600 is that containerized guest operating system I 620A controls and interacts exclusively with the group I ports 663, while the containerized guest operating system II controls and interacts exclusively with group II ports 665. Preferably there would be additional operating systems and additional port groupings. Also, although it is preferable to have containerized operating systems running on a controller kernel, as in system 600, this is not necessary. For example, an alternative embodiment might involve a computer running a containerized host OS, a hypervisor and four containerized guest OS's, with each of the five containerized OS's getting its own group of I/O ports. Although in embodiment 600, these ports are located in a peripheral hub type device, this is not necessary or even necessarily preferred. Also, these two groups are shown in FIG. 8 as being physically grouped and labeled. This is preferred, but really only a logical grouping is necessary.

The wireless printer ports 688 and 690 serve mainly as a pedagogical example here to show possible scope of the present invention relating to methods for connecting terminals. For example, because these ports are not USB ports, this shows that not all ports in a group need to be the same type of I/O port. Furthermore, because these ports are wireless, it shows that not all types of I/O ports require a traditional plug and socket type connection.

The main goal is that group I 663 and group II are supposed to support separate, independent, concurrent terminals, but a user must correctly connect up the I/O devices for this to happen. Otherwise, one terminal user's mouse might control a cursor on another terminal user's screen, rendering the multiple terminal computer system frustrating and unusable. Conventionally, this is done by having the user of a given terminal verify that a given I/O device is really intended to belong to his terminal. For example, conventionally, displays on the monitors for the multiple terminals may ask the user to make some user input (for example, press a given key on a keyboard). For example, group I monitor may ask the user to press "1" on the keyboard if the newly connected keyboard is intended to be associated with it, while the group II monitor may ask the user to press "2" on the keyboard if the newly connected keyboard is intended to be associated with it. Conventionally, the user makes his choice and a conventional terminal assignment module makes the assignment. The processes of the present invention rely on this conventional technique as a starting point.

However, according to the present invention, after two assignments within a group of I/O ports are made as explained above by user input, then subsequent assignments are made automatically by the terminal assignment module 617 of the present invention. For example, if a user plugs a keyboard, a mouse and speakers into three USB ports that belong to group I 663, and then the user indicates by user input that the speakers and the keyboard are intended to belong to guest OS I 620a and its associated monitor (not show), then the terminal assignment module will automatically assign the mouse to OS 620a, even without the need for user input specifically regarding the mouse. Terminal assignment module 617 will make a similar assignment when the user associates a wireless printer (not shown) with printer port 688 (for example, by hitting wireless connection activation buttons in sequence on the wireless printer and at port 688).

Figure 10:
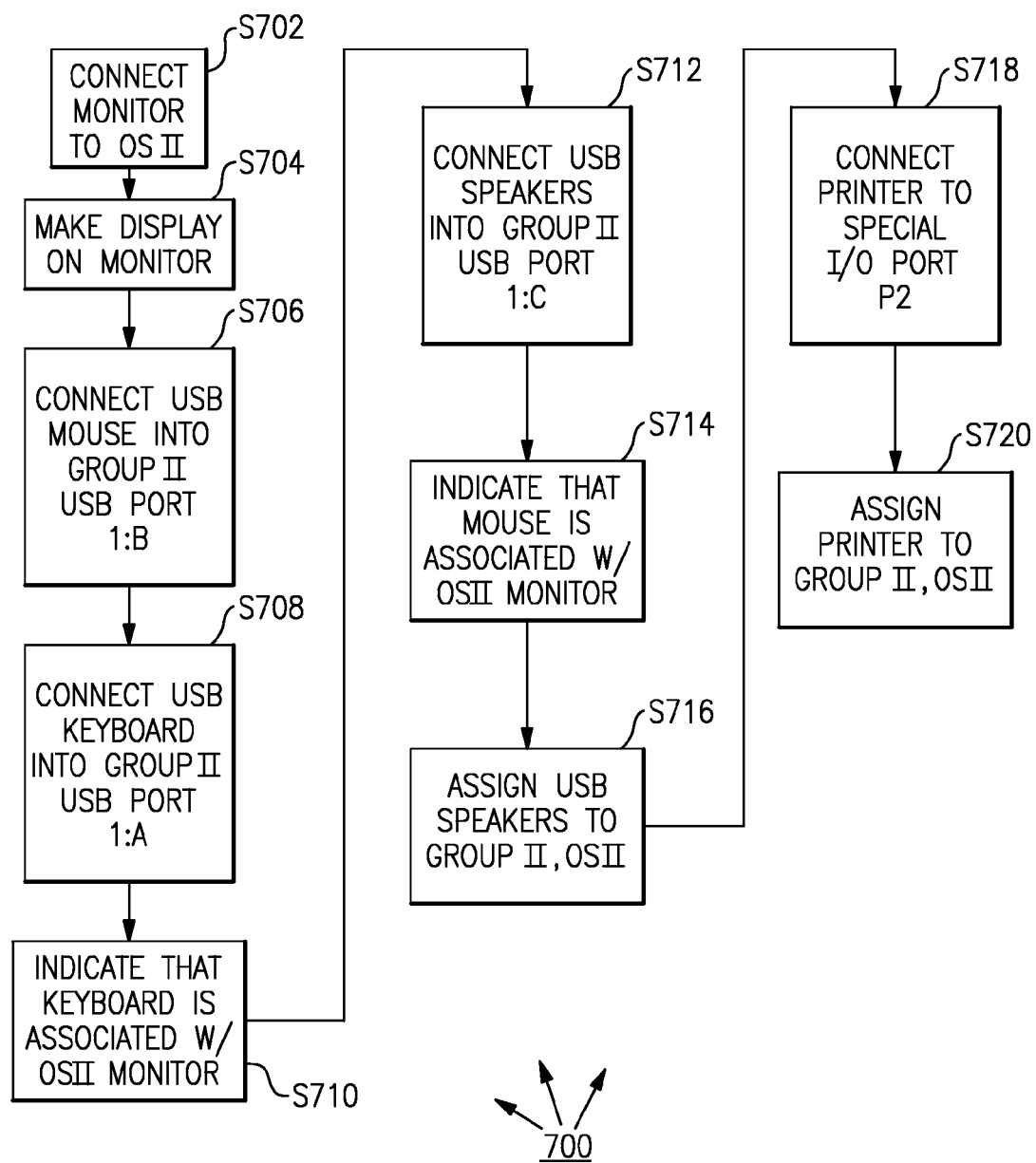
FIG. 10 is a flowchart of an I/O port assignment process according to the present invention.

A further example of this process is set forth in detail in the flowchart of FIG. 10 which includes steps S702, S704, S706, S708, S710, S712, S714, S716, S718 and S720. Note that there may be many variations in the order of steps S704 through S714.

FIG. 11 shows a computer system according to the present invention including: processing module 819; four guest operating systems 820a to 820d; four displays 832a to 832d and a video output module 890. The processing module may be any type of processing module. For example, the processing module may include processing hardware and a controller kernel. Alternatively or additionally, the processing module may include a CPU, a host OS and virtualizing middleware (for example, a VMM). Preferably the four guest OS's 820a to 820d are containerized, but this is not necessarily required. In other embodiments, there may be more or fewer than four guest OS's.

Based on the exchange of instructions between the processing module and the guest OS's, master display frame data 892 is sent to video output module 890. As shown in FIG. 11, master display frame data includes four portions 892a to 892d. Preferably, the portions are of equal size, regularly distributed and form four, respective contiguous areas as shown in FIG. 11, but this is not necessarily required. Preferably the four portions fill the master display frame area, but this is not necessarily required, and may not be preferable in embodiments that can accommodate more than four guest OS's. Preferably, the master display frame data includes a hardware cursor (not shown).

In this preferred embodiment video output module 890 does the following things: (i) hides the hardware cursor; (ii) places a software cursor in each portion 892a, b, c, d; and (iii) respectively outputs the four portions 892a, b, c, d to displays 832a, b, c, d associated with four different terminals. In this way, processing module can efficiently form and output display data in the form of a master display frame data for multiple concurrent, independent operating systems respectively associated with different terminals, while the video output module splits these up to give each terminal user the impression of having his or her own independent desktop.

DEFINITIONS

The following definitions are provided to facilitate claim interpretation:

Present invention: means at least some embodiments of the present invention; references to various feature(s) of the "present invention" throughout this document do not mean that all claimed embodiments or methods include the referenced feature(s).

First, second, third, etc. ("ordinals"): Unless otherwise noted, ordinals only serve to distinguish or identify (e.g., various members of a group); the mere use of ordinals implies neither a consecutive numerical limit nor a serial limitation.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

containerized: code portions running at least substantially independently of each other.

terminal/terminal hardware set: a set of computer peripheral hardware that includes at least one input device that can be used by a human user to input data and at least one output device that outputs data to a human user in human user readable form.

ultra thin terminal: any terminal or terminal hardware set that has substantially no memory; generally ultra thin terminals will have no more processing capability than the amount of processing capability needed to run a video display, but this is not necessarily required.

basic I/O operations: operations related to receiving input from or delivering output to a human user; basic I/O operations relate to control of I/O devices including, but not limited to keyboards, mice, visual displays and/or printers.

I/O port: includes both physical I/O ports and/or logical I/O ports of any type now known or to be developed in the future.

physical I/O port: an I/O port at which a user may connect a peripheral device.

logical I/O port: an I/O port that is addressable by processing hardware, regardless of whether or not it is a physical I/O port.

logically grouping ports: I/O ports treated as a group by computer hardware or software, whether or not the ports are in any sort of physical proximity or other physically manifested groping.

guest OS: a guest OS may be considered as a guest OS regardless of whether: (i) a host OS exists in the computer system; (ii) the existence or non-existence of other OS's on the system; and/or (iii) whether the guest OS is contained within one or more subsuming OS's.

security level: a level of privileges and permissions for accessing or exchanging instructions with processing hardware; for example, some types of processing hardware define security levels as Ring Zero (level of greatest permissions and privilege), Ring One, Ring Two, and so on; not all security levels may be used in a given computer system.

OS security level: any security level defined in a given system that is consistent with normal operations of a typical operating system running directly on the processing hardware (and not as a virtual machine); for example, for an Intel/Windows type of processing hardware Ring Zero, Ring One and perhaps Ring Two would be considered as "OS security levels," but Ring Three and higher would not.

native form: a form of instructions that can be operatively received by and/or is output from processing hardware directly and without any sort of translation or modification to form by software running on the hardware; generally speaking, different processing hardware types are characterized by different native forms.

POSIX: includes, but is not limited to, LINUX.

processing hardware: typically takes the form of a central processing unit, but it is not necessarily so limited; processing hardware is not limited to any specific type and/or manufacturer (for examples, Intel/Windows, Apple, Sun, Motorola); processing hardware may include multiple cores, and different cores may or may not be allocated to different guest operating systems and/or groups of operating systems.

Computer system: any computer system without regard to: (i) whether the constituent elements of the system are located within proximity to each other; and/or (ii) whether the constituent elements are located in the same housing.

Exchange instructions: includes: (i) two way exchanges of instructions flowing in both directions between two elements; and/or (ii) one way transmission of instructions flowing in a single direction from one element to another.

Memory portion: any portion of a memory structure or structures, including, but not necessarily limited to, hard drive space, flash drive, jump drive, solid state memory, cache memory, DRAM, RAM and/or ROM; memory portions are not limited to: (i) portions with consecutive physical addresses; (ii) portions with consecutive logical address; (iii) portions located within a single piece of hardware; (iv) portions located so that the entire portion is in the same locational proximity; and/or (v) portions located entirely on a single piece of hardware (for example, in a single DRAM).

cycle: any process that returns to its beginning and then repeats itself at least once in the same sequence.

selectively allow: the selectivity may be implemented in many, various ways, such as regular cycling, user input directed, dynamically scheduled, random, etc.

pre-empt: includes, but is not limited to, delay, queue, interrupt, etc.

processing module: hardware and/or software that does processing; processing modules include, but are not necessarily limited to processing hardware; for example, processing hardware with processing software running on it may form a processing module.

video output module: any hardware and/or software that outputs video or display data; video output modules include, but are not necessarily limited to video card(s).

first video output is different than the second video output: denotes only the degree of physical, electronic, mechanical and/or data communication segregation needed to generate two distinct displays that typical users would consider the output of the respective video outputs as generating distinct displays.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control. If the definitions provided above are broader than the ordinary, plain, and accustomed meanings in some aspect, then the above definitions shall be considered to broaden the claim accordingly.

To the extent that a patentee may act as its own lexicographer under applicable law, it is hereby further directed that all words appearing in the claims section, except for the above-defined words, shall take on their ordinary, plain, and accustomed meanings (as generally shown by documents such as dictionaries and/or technical lexicons), and shall not be considered to be specially defined in this specification. In the situation where a word or term used in the claims has more than one alternative ordinary, plain and accustomed meaning, the broadest definition that is consistent with technological feasibility and not directly inconsistent with the specification shall control.

Unless otherwise explicitly provided in the claim language, steps in method steps or process claims need only be performed in the same time order as the order the steps are recited in the claim only to the extent that impossibility or extreme feasibility problems dictate that the recited step order (or portion of the recited step order) be used. This prohibition on inferring method step order merely from the order of step recitation in a claim applies even if the steps are labeled as (a), (b) and so on. This broad interpretation with respect to step order is to be used regardless of whether the alternative time ordering(s) of the claimed steps is particularly mentioned or discussed in this document.

What is claimed is:

1. A method of connecting a terminal to a computer, the method comprising the steps of:
  (a) providing a computer having a plurality of I/O ports, with the I/O ports having a hierarchical organization having at least a root level with a single logical I/O port, and a terminal connection level hierarchically below the root level having a plurality of physical I/O ports;
  (b) logically grouping, by the computer, the terminal connection level I/O ports into a plurality of groupings, with each grouping including at least three terminal connection level I/O ports;
  (c) subsequent to step (b), connecting an I/O device into a first terminal level I/O port that is in a first grouping of the plurality of groupings;
  (d) subsequent to step (c), indicating by user input that the I/O device connected at the first terminal level I/O port corresponds to a first terminal;
  (e) subsequent to step (b), connecting a second I/O device into a second terminal level I/O port that is in a first grouping of the plurality of groupings;
  (f) subsequent to step (e), indicating by user input that the I/O device connected at the second terminal level I/O port corresponds to the first terminal;
  (g) subsequent to step (b), connecting a third I/O device into a third terminal level I/O port that is in a first grouping of the plurality of groupings; and
  (h) subsequent to step (f), automatically assigning, by the computer, the third device as belonging to the first terminal.

2. The method of claim 1 wherein the plurality of physical I/O ports are all USB ports organized according to a USB hierarchy.

3. The method of claim 1 wherein:
  the first I/O device is a keyboard;
  the second I/O device is a mouse; and
  the third I/O device is an audio output device.

4. The method of claim 1 wherein the computer comprises a first guest operating system and a second guest operating system, the method further comprising the steps of:
  assigning the first guest operating system to the first terminal.

5. A computer system for use with a first I/O device, a second I/O device and a third I/O device, the system comprising:
  a plurality of containerized operating systems;
  a plurality of physical I/O ports; and
  a terminal assignment module structured and/or programmed to:
    logically grouping the physical I/O ports into a plurality of groupings, including a first grouping, with each grouping including at least three physical I/O ports,
    receive a first user input indicating that the first I/O device connected at a first physical I/O port in a selected grouping corresponds to a first operating system of the plurality of containerized operating systems,
    receive a second user input indicating that the second I/O device connected at a second physical I/O port in the selected grouping corresponds to the first operating system, and
    automatically assign the third I/O device connected at a third physical I/O port in the selected grouping to the first operating system.

6. A computer system comprising:
  a processing module structured and/or programmed to create a master display frame data;
  a first operating system;
  a second operating system; and
  a video output module comprising a plurality of video outputs with each video output being structured and electrically connected to output a respective video signal suitable for generating a display on a display device, the video output module being electrically connected and/or programmed to receive the master display frame data from the processing module, to identify a first portion of the master display frame data as corresponding to the first operating system, to identify a second portion of the master display frame data as corresponding to the second operating system, to output the first portion on a first video output of the plurality of video outputs and to output the second portion on a second video output of the plurality of video outputs;
  wherein:
  the first video output is different than the second video output; and
  the first portion is different from and not substantially overlapping with the second portion.

7. The system of claim 6 wherein:
  the first operating system comprises a first windows manager module;
  the second operating system comprises a first windows manager module;
  the first windows manager module is programmed to manage the first portion as a window; and
  the second windows manager module is programmed to manage the second portion as a window.

8. The system of claim 7 wherein:
  the first windows manager module is further programmed to generate a first software cursor in the first portion; and
  the second windows manager module is further programmed to generate a second software cursor in the second portion.

9. The system of claim 7 wherein:
  the first windows manager module is programmed to manage the first portion in a manner so that it hides a hardware cursor; and
  the second windows manager module is programmed to manage the second portion in a manner so that it hides a hardware cursor.

10. The system of claim 6 wherein the first operating system is containerized with respect to the second operating system.

* * * * *